United States Patent
Hodges et al.

(10) Patent No.: US 7,860,516 B2
(45) Date of Patent: Dec. 28, 2010

(54) AUTOMATIC LOCALIZATION OF DEVICES

(75) Inventors: Stephen Hodges, Cambridge (GB); John Chiloyan, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 440 days.

(21) Appl. No.: 11/566,860

(22) Filed: Dec. 5, 2006

(65) Prior Publication Data

US 2008/0133791 A1 Jun. 5, 2008

(51) Int. Cl.
*H04W 24/00* (2009.01)
(52) U.S. Cl. .................. 455/456.1; 455/456.4
(58) Field of Classification Search ............ 455/434, 455/456.1, 456.3, 456.4
See application file for complete search history.

(56) References Cited

U.S. PATENT DOCUMENTS

| | | | |
|---|---|---|---|
| 6,415,220 B1 | 7/2002 | Kovacs | |
| 6,484,029 B2* | 11/2002 | Hughes et al. | 455/434 |
| 6,539,230 B2 | 3/2003 | Yen | |
| 6,750,813 B2 | 6/2004 | Vargas-Hurlston et al. | |
| 6,879,838 B2 | 4/2005 | Rankin et al. | |
| 6,931,130 B1* | 8/2005 | Kraft et al. | 380/258 |
| 6,963,749 B2 | 11/2005 | Hayashida | |
| 2002/0054097 A1* | 5/2002 | Hetherington et al. | 345/762 |
| 2002/0082022 A1* | 6/2002 | Johnson | 455/450 |
| 2002/0119788 A1* | 8/2002 | Parupudi et al. | 455/456 |
| 2002/0143930 A1 | 10/2002 | Babu et al. | |
| 2002/0145984 A1 | 10/2002 | Babu et al. | |
| 2004/0010404 A1* | 1/2004 | Cheng et al. | 704/8 |
| 2005/0064856 A1* | 3/2005 | Atkin et al. | 455/418 |
| 2005/0064877 A1 | 3/2005 | Gum et al. | |
| 2005/0114800 A1* | 5/2005 | Rao | 715/867 |
| 2005/0181808 A1* | 8/2005 | Vaudreuil | 455/456.3 |
| 2005/0203757 A1* | 9/2005 | Lei et al. | 705/1 |
| 2005/0221841 A1 | 10/2005 | Piccionelli et al. | |
| 2006/0089792 A1 | 4/2006 | Manber et al. | |
| 2006/0107219 A1* | 5/2006 | Ahya et al. | 715/745 |
| 2006/0135067 A1* | 6/2006 | Dunko | 455/41.2 |
| 2006/0154605 A1* | 7/2006 | Ham | 455/41.2 |
| 2006/0258368 A1 | 11/2006 | Granito et al. | |

FOREIGN PATENT DOCUMENTS

| | | |
|---|---|---|
| WO | WO0161671 A1 | 8/2001 |
| WO | WO2004044670 A2 | 5/2004 |
| WO | WO 2005120120 A1 * | 12/2005 |
| WO | WO2006068661 | 6/2006 |
| WO | WO2006079165 A1 | 8/2006 |

OTHER PUBLICATIONS

Pescovitz, David, Location, Location, Location: Place Lab and the Bootstrapping of Location-Enhanced Computing, May 3, 2004, Intel Research and Development, version 3.*

(Continued)

*Primary Examiner*—Lewis G West
*Assistant Examiner*—Opiribo Georgewill
(74) *Attorney, Agent, or Firm*—Lee & Hayes, PLLC

(57) ABSTRACT

A device is described which changes its operation dependent upon the location of the device. The device accesses parameters which are specific to its location and uses these to determine how the operation of the device should be changed.

16 Claims, 6 Drawing Sheets

OTHER PUBLICATIONS

Jiang et al., "A Hybrid Location Model with a Computable Location Identifier for Ubiquitous Computing", UbiComp 2002, LNCS 2498, pp. 246-263, 2002.*

Jiang et al., "A Hybrid Location Model with Computable Location Identifier for Ubiquitous Computing". UbiComp 2002, LNCS 2498, pp. 246-263, 2002.*

Chen, et al., "A Survey of Context-Aware Mobile Computing Research", available at least as early as <<Nov. 21, 2006>>, at <<http://shamir.eas.asu.edu/~cse591uc/papers/chen00survey.pdf>>, pp. 1-16.

Pescovitz, "Location, Location, Location Place Lab and the Boostrapping of Location-Enhanced Computing", at <<http://www.intel.com/research/print/Place_Lab.pdf>>,Intel Corporation 2003, Version # 3, May 3, 2004, pp. 1-7.

Swedberg, "Ericsson's Mobile Location Solution", available at least as early as <<Nov. 21, 2006>>, at <<http://www.ericsson.com/ericsson/corpinfo/publications/review/1999_04/files/1990406.pdf>>, pp. 214-221.

PCT International Search Report dated May 13, 2008 for corresponding PCT Application No. PCT/US07/86427, 4 pages.

* cited by examiner

AUTOMATIC LOCALIZATION OF DEVICES

BACKGROUND

In order that a software product can be released in many countries, the software product goes through a process known as 'localization' in which various aspects of the user interface (UI) are modified for the specific country. Localization often includes translation of all the string elements within the UI of the product and any other language specific parts (e.g. hotkeys, units, sizes) from the language in which it was originally written to the language for the specific country.

For some software products and also for hardware products, changes must also be made to ensure that the operation of the product complies with local legislation. For example, there may be different regulations controlling the permitted electromagnetic emissions of a device and some countries require that a camera phone provides an audible indication when an image is captured. These different regulations often lead to manufacturers producing different models of a product where each model is aimed at a specific market and has been tailored to meet the appropriate standards and comply with the legislation in that market.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

A device is described which changes its operation dependent upon the location of the device. The device accesses parameters which are specific to its location and uses these to determine how the operation of the device should be changed.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although mobile electronic devices such as mobile telephones and personal digital assistants (PDAs) may be built for a single market, it is likely that they will be used in many different countries as the user travels. In order to ensure that the mobile electronic device does not break any laws in countries to which the user travels, one solution is to develop mobile electronic devices which comply with the legislation in all countries or in a collection of countries (e.g. a device which complies with all European and US legislation). However, this may result in sub-optimum performance of the device and in some cases may not be possible where the regulations specify conflicting parameters (e.g. relating to frequencies for transmission of data).

Another solution is to change the operation of the device dependent upon the location of the device. This enables the device to perform optimally in any particular location whilst still ensuring that it complies with local legislation. In addition to automatically changing the operation of the device to comply with local legislation, the operation of the device (hardware/software) may also be changed to suit the appropriate lingual, social and cultural requirements. The changes made may be different dependent on whether the device is mobile or non-mobile (i.e. generally used in one place, such as a desktop PC). For example, for mobile devices moving from a first country to a second country, the user is unlikely to change (e.g. when a user goes abroad) and therefore the lingual requirements will not change (the device should still use a UI in the language of the first country). However, where a typically non-mobile device (e.g. a larger device) is moved from a first country to a second country, this may be for deployment (or redeployment) and therefore the user may be from the second country and therefore the lingual requirements may change.

Figure 1:
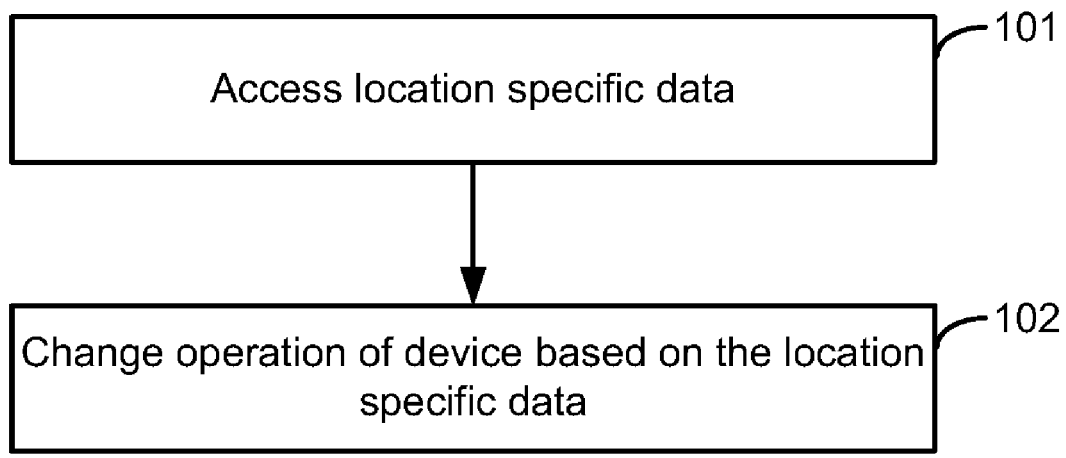
FIG. 1 is an example flow diagram of a method of automatic localization of a device.

FIG. 1 is an example flow diagram of a method of automatic localization of a device. This method may be described with reference to FIGS. 2 and 3 which show schematic diagrams of two example systems in which the method may be used. Further examples of the method and systems in which it may be used are described in more detail below.

Figure 2:
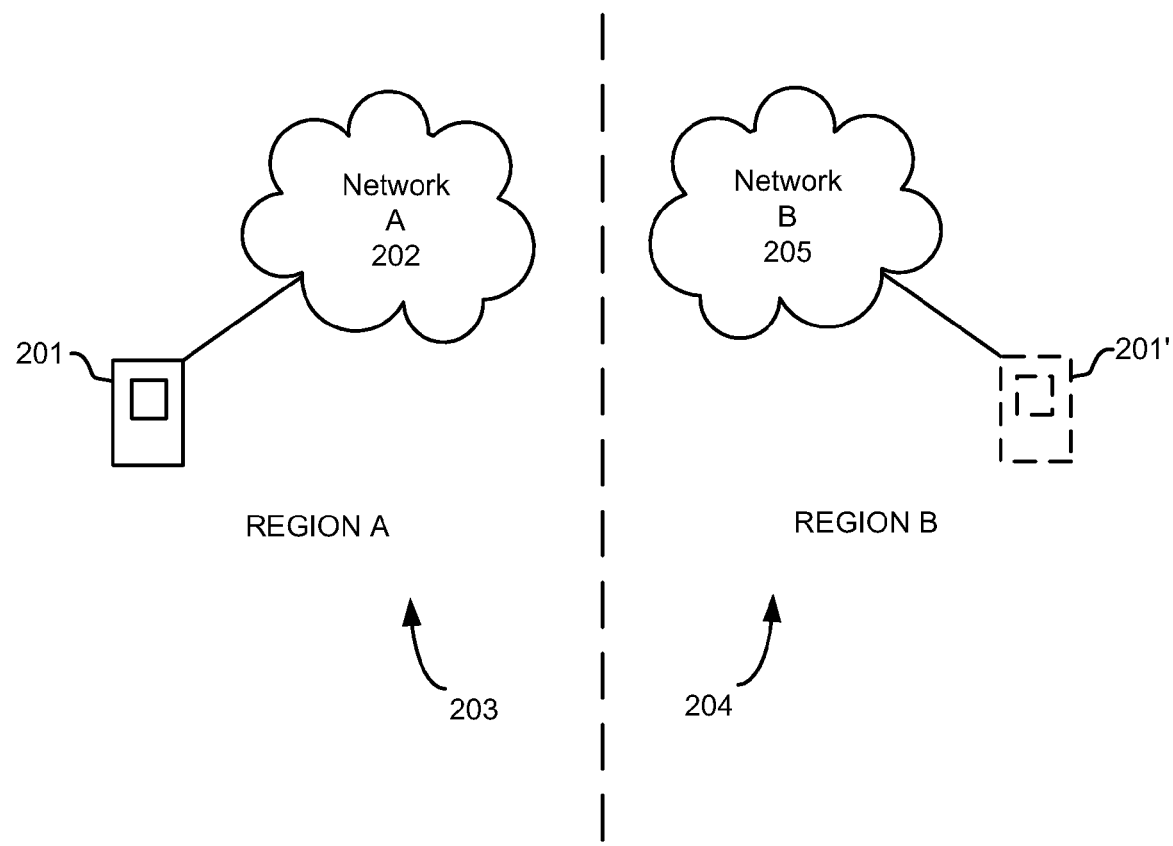
FIG. 2 is a schematic diagram of an example system.

As shown in FIG. 2, a device 201 is initially connected to a network 202, referred to as 'network A' in region A 203. If the device is subsequently moved to region B 204, as shown by the dashed outline of the device 201', it may cease to be connected to network A 202 but instead connect to a new network 205, network B, which operates in region B. The connection to the new network 205 by the device may be automatic (e.g. according to a communication protocol for the device) or may be manual (e.g. through connection initiated by the user). Having changed location, the device 201 accesses data which is specific to its new location (step 101), e.g. information which is specific to region B and then changes the operation of the device based on that location specific data (step 102). As described in more detail below, the location specific data may be retrieved by the device e.g. from a memory within the device, from removable media or from a remote location via a network (e.g. network B 205). This data retrieval may be triggered by the detection of location by the device or in response to location information provided to the device (e.g. from network B or from a local transmitter). In another example, the location specific data may be pushed to the device (e.g. from network B or from a local transmitter).

Figure 3:
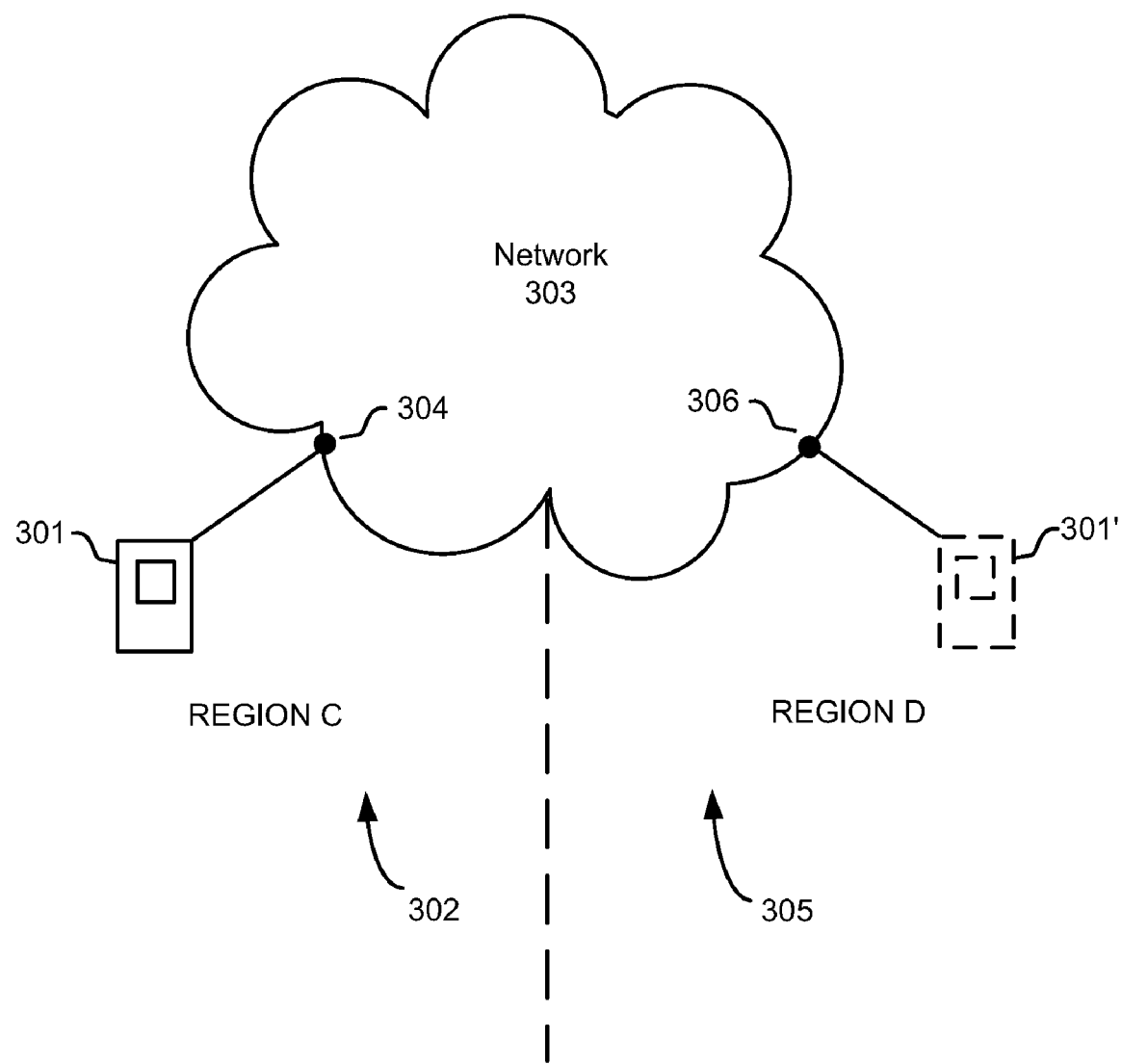
FIG. 3 is a schematic diagram of a second example system.

In another example, as shown in FIG. 3, a device 301 located in region C 302 may be connected to a network 303 via an access point 304. This access point may be any means by which a device can be connected to the network and will be dependent upon the network type. Examples of access points include, but are not limited to, base stations, wireless access points, Ethernet connections, modems, line cards etc. If the device subsequently moves to a second location, in region D 305 (as shown by the dashed outline of the device 301') which may still be served by the same network 303, the device may now be connected via a different access point 306. Having changed location, the device 301 accesses data which is specific to the new location (step 101) e.g. region D 305 or access point 306. This data is then used by the device to change its operation (step 102).

The networks shown in FIGS. 2 and 3 may be any type of network, for example, a GSM, 3G, GPRS or CDMA network. In other examples the network may be an IP network, a fixed telephone network, an intranet or the internet. The device may connect to the network wirelessly (e.g. via Bluetooth, WiFi, GSM etc) or the device may be connected to the network by means of a cable (e.g. an Ethernet cable). In other examples, the device may not be connected to a network, as described in more detail below.

The location specific data may comprise a set of rules that the device must comply with and/or sets of parameters to be used by the device at the particular location. These rules and/or parameters may relate to any aspect of the device's operation, for example:

EM emissions for particular wavelength ranges, whether intentional or unintentional emissions
transmission frequencies e.g. Bluetooth frequencies (e.g. for device to device communication)
reception frequencies e.g. for broadcast media such as television and radio
transmission powers
requirement for the device to make a noise on image capture
prevention of or limitations relating to audio recording
limitations relating to publication and/or distribution of media such as images
types and/or strengths of encryption which are allowed
protocols and/or standards which are to be used or are allowed (e.g. PAL or NTSC)
alarms
acceptable audible tones e.g. ring tones, alarm alerts etc
permitted volume levels for audible tones
power consumption
use of any sensors within the device or use of the sensor data
language
available themes, backgrounds or other visual aspects of a UI
software variants/versions
alphabet, currency, calendar
keyboard and peripheral settings such as paper size Some of these rules/parameters may result in changes in software within the device and some of these rules/parameters may result in changes in performance of the hardware.

The location specific data may further comprise other data relating to location specific laws or regulations, such as data relating to location specific airport regulations (e.g. customs information, security information), location specific driving laws (e.g. the ten most important traffic laws), location specific safety/security advice etc. This other data and/or the rules/parameters described above may be presented to the user via a user interface (e.g. through a custom application on the device or using an existing application).

As described above, the location specific data may be accessed by the device from any location including local memory (e.g. from a memory within the device), removable media or a remote data store. In an example a central service provider (or a network provider) may maintain a central repository of location specific data. This central repository may be a database containing the location specific data for some/all locations or it may contain details of where location specific data is located for each country. In an example, a service provider may host a web site with links to the locations of location specific data for each country. The location specific data may then be maintained within each country, for example by a central agency or government body. In a further example, the device may use a search tool to find the location specific data (e.g. using www.live.com to search for "communications regulations in France"). In another example, a device manufacturer may provide a library of device settings (which comprises the location specific data) for particular locations which may be accessed by the device. The data stored remotely to the device may be accessed whenever the device moves location in order to obtain the specific data for the new location or alternatively, the data may be copied from the remote data store(s) and stored locally on the device. The device may then periodically access the remote data store(s) to obtain any updates to the data. Such a method may be particularly suitable where the location specific data is changed infrequently and/or where it is undesirable for the device to need to disclose its current location to the provider of the data store(s). Where a device is not (or is not normally) connected to a network, such updates to locally stored location specific data may be periodically downloaded to the device via a networked device, such as a computer.

In another example, the location specific data may be accessed by the device as a result of the data being pushed to the device. The data may be pushed by the network operator or by a service provider based on the location of the device (e.g. based on the network or the access point to which the device is connected). The data may be pushed in the form of a SMS message, a MMS message, a WAP push or any other suitable technology. The data may be pushed from the network (e.g. via the appropriate access point) or from a local transmitter. A user may be prompted to accept the pushed data or the data may be automatically accepted by the device. The data may be pushed to the device each time it changes region or alternatively the data may only be pushed to a device upon entry to a new region if the device does not already have the current location specific data for that region. In such an example, data may be pushed to the device where the stored location specific data for that region is out of date.

The regions referred to in the description above and shown in FIGS. 2 and 3 may be very large, for example covering several countries (e.g. the European Union or North America). In other examples the regions may be smaller (e.g. single countries or states) and in some cases may be very small (e.g. a street, a company, a building, a room etc).

Figure 4:
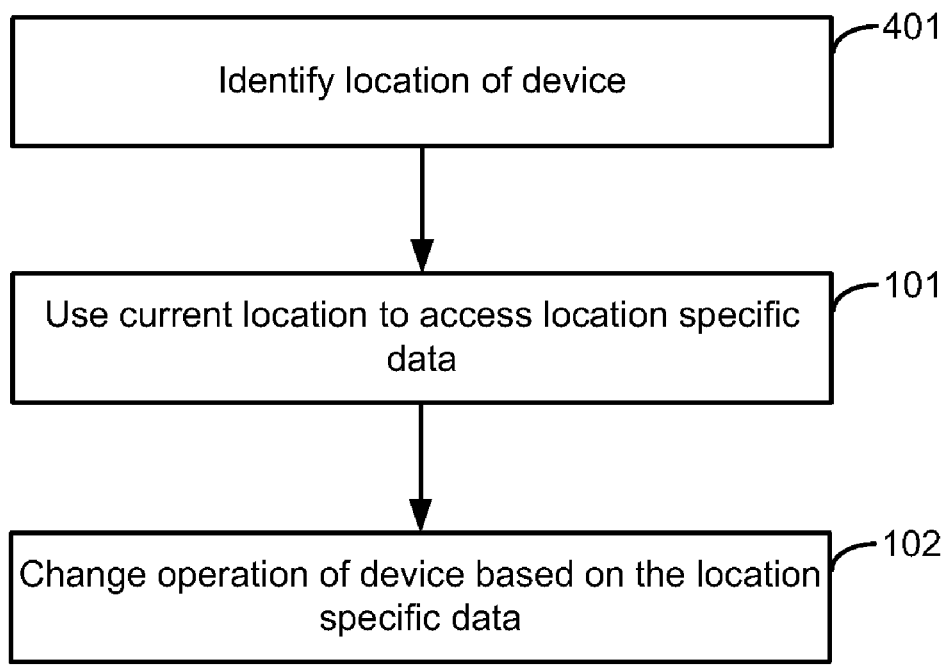
FIG. 4 is a second example flow diagram of a method of automatic localization of a device.

FIG. 4 is a second example flow diagram of a method of automatic localization of a device in which the location of the device is identified (step 401) and this triggers the accessing of location specific data (step 101, as described above). This location specific data is then used to change the operation of the device (step 102, as described above). The device may identify its location (in step 401) by detecting the location of the device or alternatively the network may detect the location of the device and communicate this to the device, such that the device identifies its location (in step 401) from a message received from the network.

The network may detect the location of the device using any suitable method, including, but not limited to the network or the access point (e.g. base station) to which the device is connected or the IP (Internet Protocol) address of the device. Techniques developed for locating devices where emergency calls originate (particularly where the device is a wireless device or is connected to an IP network) or for tracking devices may be used to provide location information for the device. This location information is then transmitted to the device such that the device can identify its location (step 401). In addition to, or instead of, transmitting this location information, the network may transmit details describing where the location specific data may be accessed from (e.g. in the form of a URL or IP address) or the network may push the location specific data (as described above).

The device may detect its location using any suitable method, including, but not limited to use of a GPS receiver or the network or the access point (e.g. base station) to which the device is connected. Where the device can detect signals from more than one access point (e.g. from more than one base station) then this data may be used to provide more accurate location information (e.g. using triangulation or any other combination of location information). Where data is accessed from a remote location via a network, the network used for accessing the data may be the same network that may be used for identifying location of the device or may be a different network. In an example, a device may determine its location based on its connection to a Wifi hotspot, however the relevant location specific data may be accessed via a GPRS network. In further examples, the device may identify location based on other factors (e.g. mains voltage, power lead used etc).

Different methods of location detection (by the network or the device) provide different levels of granularity of location information, for example, knowledge of the network to which a device is connected is likely to provide information on the country in which the device is located, whilst knowledge of the access point to which a device is connected is likely to provide much more precise location information particularly where the access point is wireless and the range of the wireless is link is short (e.g. a WiFi hotspot or a Bluetooth access point). Where the device is connected to a fixed network, the location may be known precisely (e.g. where a port is registered to a particular location) or the location may be determined less precisely (as described above).

In an example, a mobile telephone may be purchased in the UK by a UK based user. The mobile telephone therefore complies with UK legislation. If the user travels to Dubai, the mobile telephone roams and connects to the local mobile telephone network. The mobile telephone detects that it is connected to a network in Dubai and therefore accesses a remote data source containing rules for operation of mobile telephones in Dubai and changes the operation of the mobile telephone to comply with those rules. This enables the mobile telephone to optimize its performance for use in Dubai without contravening any legislation. When the user returns to the UK, the telephone detects that it has connected to a UK network. In this situation it may access UK specific data or alternatively may return to the 'default' or 'home' operation of the telephone which cancels any of the changes made when the device traveled to Dubai.

In a second example, a computer may be built and tested in the UK to comply with UK legislation. The computer may subsequently be shipped to France and deployed in France e.g. by connection to a corporate network in France by means of an Ethernet connection. Location information may be passed to the computer via the corporate network and as a result, the computer may access a locally stored library of rules for France. On the basis of these rules, the computer may alter its operation such that it complies with French legislation, launches the French versions of the operating system and any applications and offers a custom set of backgrounds and screensavers which has been provided for use in France.

In the above examples, location specific data for a single location is accessed by each device at any time, for example, as shown in FIGS. 2 and 3, the device is located in either region A or region B, or in region C or region D. However, in other examples, location specific data may be provided in a layered structure such that a device may be simultaneously be located in more than one region, resulting in the need to access more than one set of location specific data. This can be described in more detail with reference to FIG. 5, which shows an example system. When a mobile device 501 moves along the trajectory shown by arrow 502 it first enters region E 503 and at this point the device accesses location specific data for region E (as in step 101) and then changes the operation of the device based on that location specific data (as in step 102), as shown in either FIG. 1 or FIG. 4. When the device proceeds further, it enters region F 504 which is within region E 503. Again the device accesses location specific data (for region F) and changes the operation of the device accordingly (as shown in FIG. 1 or FIG. 4) to comply with the rules/parameters for both regions E and F.

The triggers for accessing the location specific data in the two regions E and F may be different. For example, region E may be a country and on entry to region E the device may identify the location of the device (e.g. using one of the techniques described above) and this may trigger the accessing of the location specific data for region E (as shown in FIG. 4). However, when the device enters the smaller region, region F, which may for example be a building, the location information or the location specific data may be pushed to it (e.g. as described above).

The location specific data in the two regions E and F may relate to different aspects of the device's operation or alternatively may result in complying with different sets of legislation/regulations. For example, the larger region's location specific data may be such as to ensure that the device complies with the relevant legislation for that country/region/state etc, whilst the smaller region's location specific data may be such as to make the device comply with local policy (e.g. no images to be captured, no audible alerts or ring tones, automatically switching to 'flight mode' when on an airplane or going through immigration etc). Where two regions overlap, the location specific data may be flagged to indicate that the new location specific data is to be complied with in addition to the previously received location specific data and not instead of the previously received location specific data. In another example, data sets may be flagged to identify which regions lie within other regions and/or to identify which location specific data sets have priority over other data sets.

Figure 5:
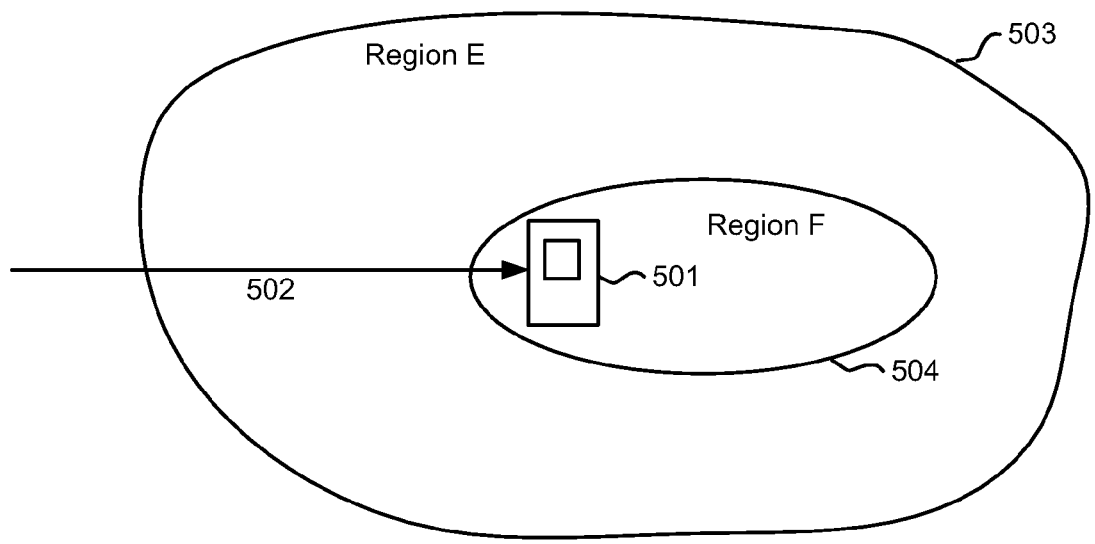
FIG. 5 is a schematic diagram of a third example system.

By using such a tiered approach, as shown in FIG. 5 and described above, local rules may be maintained and implemented on a small scale. The small region may be defined by coverage of a Wifi network, by access point or any other technique and the set of local parameters/rules which comprise the location specific data may be hosted locally and pushed to or otherwise accessed by the device (e.g. the location of the location specific data may be pushed to the device). By hosting the location specific data locally, it is not necessary for the small region (e.g. a company, a building etc) to register with a central entity such that the device can access the correct location specific data. The local system may maintain a list of devices that they have recently pushed location specific data (or information relating to that data) to such that they do not need to push data to that device again unless the data has changed or such that they do not need to push the data again within a specified time period (e.g. 24 hours).

Whilst the above examples relate to devices which connect to a network, the methods are equally applicable to devices which do not connect to a network, such as a camera. In such an example, the device may detect the presence of a network, whilst not connecting to that network, and use the information detected to determine location. In another example the device may detect location using other techniques (e.g. GPS or other positioning system) and access location specific data based on the location determination. In a further example, the device may identify location based on other factors (e.g. mains voltage, power lead used etc). Where the device is not connected to a network, the location specific data may be stored locally or may be pushed to the device (e.g. via a Bluetooth or IRDA link).

The above methods are applicable to any mobile or portable device, including, but not limited to, electronic devices such as laptop computers, tablet PCs, mobile telephones, PDAs, cameras and watches. The above methods are also applicable to any non-mobile device, including, but not limited to, computers, televisions, radios, RFID (radio frequency identification) readers, ATMs (automated teller machine), cash registers, point of sale machines (e.g. chip and pin machines for credit/debit cards) and home appliances (e.g. microwave ovens, fridge freezers etc).

Figure 6:
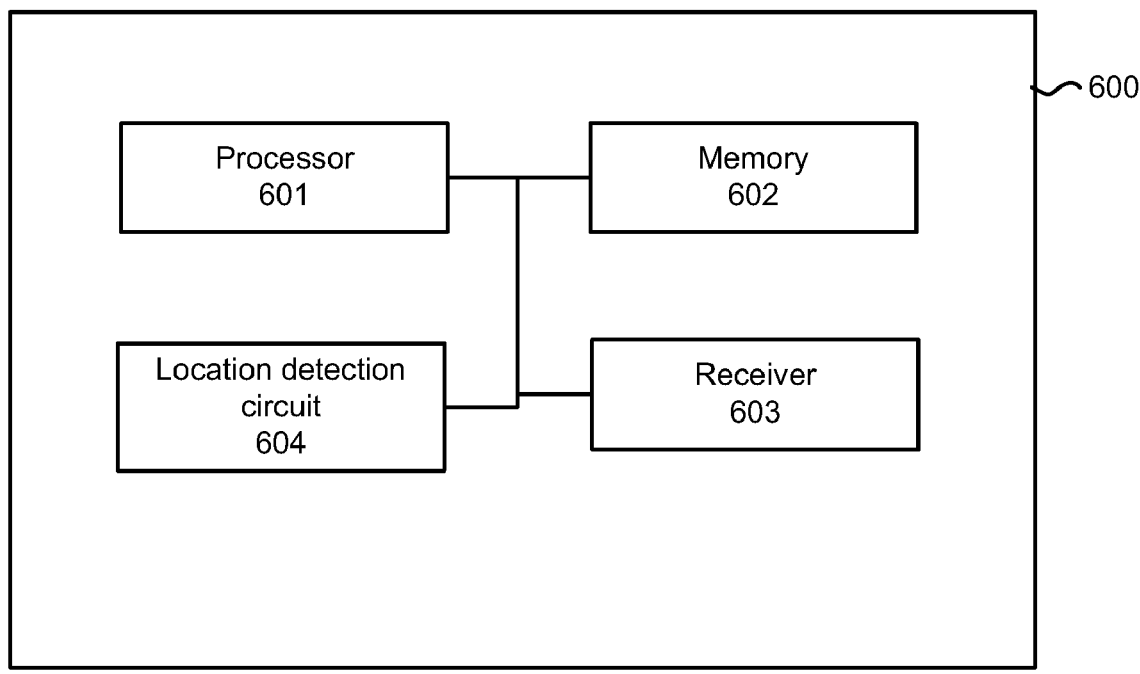
FIG. 6 is a schematic diagram of an example device.

FIG. 6 shows a schematic diagram of a device 600 which operates as described above. The device comprises a processor 601, a memory 602 and a receiver 603. The memory 602 is arranged to store executable instructions arranged to cause the processor to perform any of the method steps described above. The memory may also store location specific data once accessed from a remote data store and/or locally stored location specific data. The receiver 603 may be used to communicate with a network (e.g. a wireless network) or to receive signals to enable the device to identify its location. Alternatively, the receiver 603 may be part of a network interface for connection to any network. The device 600 may, in some examples, further comprise a location detection circuit 604 (e.g. a GPS receiver or a RF beacon detector). The location detection circuit may determine the location of the device using any suitable technique (e.g. any of those described above). It will be appreciated that the device 600 may comprise many other elements (e.g. user input devices, display devices etc) not shown in FIG. 6.

Although the present examples are described and illustrated herein as being implemented in a communications network, the system described is provided as an example and not a limitation. As those skilled in the art will appreciate, the present examples are suitable for application in a variety of different types of systems and the method may be implemented in devices without any network connection (e.g. devices with GPS capability or other location detection capability).

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. It will further be understood that references to 'an' item refer to one or more of those items.

The steps of the methods described herein may be carried out in any suitable order, or simultaneously where appropriate.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A method implemented, at least in part, by a device having a processor executing instructions stored in a memory, the method comprising:
   receiving, by the processor, as a result of moving the device from a first geographic region to a second geographic region, location-specific data corresponding to a location of the device in the second geographic region;
   wherein the device operates in the first geographic region according to a first set of location-specific rules of operation for the first geographic region;
   wherein the location-specific data provides a second set of location-specific rules of operation for operating the device in the second geographic region;
   wherein the location-specific data is pushed to the device as a result of moving the device to the second geographic region, wherein the location-specific data is pushed to the device based on a location of a network or an access point in the second geographic region to which the device is connected;
   changing, by the processor, one or more operating parameters of the device based on the receiving of the location-specific data for operating the device in accordance with the second set of location-specific rules, the one or more changed operating parameters of the device being related to requiring the device to make a noise on image capture;

locating the device within a smaller region located within the second geographic region;

connecting to a local network while within the smaller region, wherein the smaller region has a third set of location-specific rules of operation, different from the first set of location-specific rules of operation and the second set of location-specific rules of operation;

receiving additional data at the device via the local network as a result of connecting to the local network while within the smaller region, the additional data being received for configuring the device to operate according to the third set of location-specific rules of operation for the smaller region located within the second geographic region, wherein the additional data is pushed to the device based on the location of the device within the smaller region and automatically accepted by the device as a result of the device connecting to the local network while within the smaller region, wherein the third set of location-specific rules complies with the second set of location-specific rules, and places a compliance with local policy on the device for preventing the device from performing one or more functions;

as a result of automatically accepting the additional data pushed to the device, changing one or more of the operating parameters of the device based on the third set of location-specific rules of operation for the smaller region, wherein the second set of location-specific rules and the third set of location-specific rules are flagged to identify which of the second set of location-specific rules and third set of location-specific rules has priority over the other, and wherein the smaller region is defined by coverage of a particular wireless network as the local network, and the third set of location-specific rules are hosted locally for the particular wireless network, while the first set and second set of location-specific rules are hosted at a central repository.

2. A method according to claim 1, wherein the location-specific data or the additional location-specific data pushed to the device is automatically accepted by the device for changing the one or more operating parameters of the device.

3. A method according to claim 1, wherein the location-specific data is pushed to the device as a result of determining that stored location-specific data stored on the device for the second region is out of date.

4. A method according to claim 1, wherein the location-specific data or the additional location-specific data is pushed to the device as an SMS (short message service) message or an MMS (multimedia message service) message.

5. A method according to claim 1, wherein the device automatically reverts to location-specific data for the first geographic region as a result of connecting to a network or access point in the first region.

6. A method according to claim 1, wherein the location-specific data or the additional location-specific data is pushed to the device, and a user of the device is prompted to accept the location-specific data.

7. A method according to claim 1, wherein the device is a computer, and the changing the one or more operating parameters comprises changing a version of an operating system of the computer from a first version of the first geographic region to a second version of the second geographic region, wherein the second version provides custom backgrounds and screensavers for use in the second geographic region.

8. A method according to claim 1, wherein the location of the device within the second geographic region is determined by:
determining the network to which the device is connected; and
identifying the location of the device based on the location of the network within the second geographic region.

9. A method according to claim 1, wherein additional location-specific data for additional geographic regions is pushed to the device upon each entry into an additional geographic region which the device has not entered before.

10. A method according to claim 1, wherein data corresponding to the second set of location-specific rules is maintained by a host located within the second geographic region and pushed to the device by a service provider upon entry into the second geographic region when a determination is made that the device has out of date location-specific rules for the second geographic region.

11. A method according to claim 1, wherein the local policy prevents the device from capturing an image while within the smaller region.

12. A method according to claim 1, wherein the local policy prevents the device from providing audible alerts while within the smaller region.

13. One or more machine readable storage media containing device-executable instructions embodied thereon in machine readable form, the device-executable instructions adapted to be executed by a processor for performing a method comprising:

operating a device, by the processor, according to a first set of location-specific rules of operation based on a first location of the device, the first location being defined as within a first geographic region;

accessing location-specific data corresponding to a relocation of the device to a second geographic region, wherein the second geographic region has a second set of location-specific rules of operation, the second set of location-specific rules of operation being different than the first set of location-specific rules of operation of the first geographic region;

changing one or more operating parameters of the device based on the location-specific data;

accessing additional location-specific data as a result of entry of the device into a smaller region within the second geographic region, the smaller region being defined by coverage of a particular wireless network, and the third set of location-specific rules being hosted locally for the particular wireless network, wherein the third set of location-specific rules complies with the second set of location-specific rules, and places a compliance with local policy on the device for preventing the device from performing one or more functions; and as a result of accepting the additional location-specific data corresponding to entry of the device into the smaller region, changing one or more of the operating parameters of the device based on the third set of location-specific rules of operation for the smaller region, wherein the second set of location-specific rules and the third set of location-specific rules are flagged to identify which of the second set of location-specific rules and third set of location-specific rules has priority over the other, and wherein the location-specific rules relate to requiring the device to make a noise on image capture;

locating the device within a smaller region located within the second geographic region;

connecting to a local network while within the smaller region, wherein the smaller region has a third set of location-specific rules of operation, different from the first set of location-specific rules of operation and the second set of location-specific rules of operation;

receiving additional data at the device via the local network as a result of connecting to the local network while within the smaller region, the additional data being received for configuring the device to operate according to the third set of location-specific rules of operation for the smaller region located within the second geographic region, wherein the additional data is pushed to the device based on the location of the device within the smaller region and automatically accepted by the device as a result of the device connecting to the local network while within the smaller region, wherein the third set of location-specific rules complies with the second set of location-specific rules, and places a compliance with local policy on the device for preventing the device from performing one or more functions;

as a result of automatically accepting the additional data pushed to the device, changing one or more of the operating parameters of the device based on the third set of location-specific rules of operation for the smaller region, wherein the second set of location-specific rules and the third set of location-specific rules are flagged to identify which of the second set of location-specific rules and third set of location-specific rules has priority over the other, and wherein the smaller region is defined by coverage of a particular wireless network as the local network, and the third set of location-specific rules are hosted locally for the particular wireless network, while the first set and second set of location-specific rules are hosted at a central repository.

14. A device comprising:
a processor; and
a memory arranged to store executable instructions which when executed cause the processor to:
  operate the device according to a first set of location-specific rules of operation based on a first location of the device, the first location being defined as within a first geographic region;
  connect to a network within a second geographic region outside the first geographic region to determine a second location of the device when the device is moved from the first geographic region to the second geographic region, wherein the second geographic region has a second set of location-specific rules of operation, the second set of location-specific rules of operation being different than the first set of location-specific rules of operation of the first geographic region;
  receive data at the device via the network as a result of connecting to the network while within the second geographic region, the data being received for configuring the device to operate according to the second set of location-specific rules of operation for the second geographic region, wherein the data is pushed to the device by a service provider based on the second location of the device and automatically accepted by the device as a result of the device connecting to the network while within the second geographic region; and
  as a result of automatically accepting the data pushed to the device, change one or more operating parameters of the device based on the second set of location-specific rules of operation for the second geographic region, wherein the location-specific rules relate to requiring the device to make a noise on image capture;
  locate the device within a smaller region located within the second geographic region;
  connect to a local network while within the smaller region, wherein the smaller region has a third set of location-specific rules of operation, different from the first set of location-specific rules of operation and the second set of location-specific rules of operation;
  receive additional data at the device via the local network as a result of connecting to the local network while within the smaller region, the additional data being received for configuring the device to operate according to the third set of location-specific rules of operation for the smaller region located within the second geographic region, wherein the additional data is pushed to the device based on the location of the device within the smaller region and automatically accepted by the device as a result of the device connecting to the local network while within the smaller region, wherein the third set of location-specific rules complies with the second set of location-specific rules, and places a compliance with local policy on the device for preventing the device from performing one or more functions; and
  as a result of automatically accepting the additional data pushed to the device, change one or more of the operating parameters of the device based on the third set of location-specific rules of operation for the smaller region, wherein the second set of location-specific rules and the third set of location-specific rules are flagged to identify which of the second set of location-specific rules and third set of location-specific rules has priority over the other; and wherein the smaller region is defined by coverage of a particular wireless network as the local network, and the third set of location-specific rules are hosted locally for the particular wireless network, while the first set and second set of location-specific rules are hosted at a central repository.

15. A device according to claim 14,
wherein, a local system maintains a list indicating that the additional data for the third set of location-specific rules has been pushed to the device,
wherein when the device is removed from the smaller region and entered within the smaller region again, the local system uses the list to determine whether to push the additional data to the device again.

16. A device according to claim 14, further comprising:
when the device is moved back to the first geographic region, connect to the network while within the first geographic region to determine a third location of the device;
receive new data at the device via the network as a result of connecting to the network while within the first geographic region, the new data being received for configuring the device to operate according to the first set of location-specific rules of operation for the first geographic region, wherein the new data is pushed to the device by the service provider based on the third location of the device within the first geographic region, and automatically accepted by the device as a result of the device connecting to the network while within the first geographical region; and
as a result of automatically accepting the new data pushed to the device, change the one or more operating parameters of the device based on the first set of location-specific rules of operation for the first geographic region.

* * * * *